United States Patent
Cohen (10) Patent No.: US 8,619,565 B1
(45) Date of Patent: *Dec. 31, 2013

(54) INTEGRATED CIRCUIT FOR NETWORK DELAY AND JITTER TESTING

(75) Inventor: Yuval Cohen, Raanana (IL)

(73) Assignee: Marvell International Ltd., Hamilton (BM)

( * ) Notice: Subject to any disclaimer, the term of this patent is extended or adjusted under 35 U.S.C. 154(b) by 224 days.

This patent is subject to a terminal disclaimer.

(21) Appl. No.: 12/963,372

(22) Filed: Dec. 8, 2010

Related U.S. Application Data (63) Continuation of application No. 11/056,753, filed on Feb. 11, 2005, now Pat. No. 7,864,816.

(60) Provisional application No. 60/642,583, filed on Jan. 7, 2005.

(51) Int. Cl.
*H04L 12/26* (2006.01)

(52) U.S. Cl.
USPC ......... 370/230; 370/230.1; 370/231; 370/516

(58) Field of Classification Search
None
See application file for complete search history.

(56) References Cited

U.S. PATENT DOCUMENTS

| | | | |
|---|---|---|---|
| 5,936,940 A | 8/1999 | Marin et al. | |
| 5,991,830 A | 11/1999 | Beard et al. | |
| 6,327,274 B1 | 12/2001 | Ravikanth | |
| 6,360,271 B1 * | 3/2002 | Schuster et al. | 709/231 |
| 6,570,850 B1 | 5/2003 | Gutierrez et al. | |
| 6,608,816 B1 | 8/2003 | Nichols | |
| 6,618,396 B1 | 9/2003 | Kondo et al. | |
| 6,633,540 B1 | 10/2003 | Raisanen et al. | |
| 6,643,612 B1 * | 11/2003 | Lahat et al. | 702/186 |
| 6,661,810 B1 * | 12/2003 | Skelly et al. | 370/516 |
| 6,700,876 B1 * | 3/2004 | DiNicola et al. | 370/252 |
| 6,731,631 B1 | 5/2004 | Chang et al. | |
| 6,731,638 B1 * | 5/2004 | Ofek | 370/395.4 |
| 6,766,309 B1 * | 7/2004 | Cheng et al. | 706/3 |
| 6,766,389 B2 * | 7/2004 | Hayter et al. | 710/62 |
| 6,778,493 B1 * | 8/2004 | Ishii | 370/229 |
| 6,839,794 B1 * | 1/2005 | Schober | 710/316 |

(Continued)

FOREIGN PATENT DOCUMENTS

WO     WO 00/36793     6/2000

OTHER PUBLICATIONS

U.S. Appl No. 11/031,984, filed Jan. 7, 2005, Cohen.

(Continued)

*Primary Examiner* — Marsha D. Banks Harold
*Assistant Examiner* — Christopher Wyllie (57) ABSTRACT

An integrated circuit having a corresponding method comprises one or more ports to transmit and receive packets of first data; and a forwarding engine to transfer the packets of the first data between the ports; wherein at least one of the ports comprises a packet generator to originate a first packet of the first data comprising second data representing a time of transmission of the first packet of the first data, a network transmit interface to transmit the first packet of the first data, and a network receive interface to receive a second packet of the first data transmitted in reply to the first packet of the first data; and a controller to calculate a network delay based on the second data representing the time of transmission of the first packet of the first data and the second packet of the first data.

11 Claims, 6 Drawing Sheets

(56) References Cited

U.S. PATENT DOCUMENTS

| | | | |
|---|---|---|---|
| 6,865,675 B1 | 3/2005 | Epstein | |
| 6,904,014 B1 | 6/2005 | Gai et al. | |
| 6,940,831 B1 | 9/2005 | Omi et al. | |
| 6,954,430 B2* | 10/2005 | Haglund | 370/232 |
| 6,976,085 B1 | 12/2005 | Aviani et al. | |
| 6,996,062 B1* | 2/2006 | Freed et al. | 370/235 |
| 7,088,677 B1* | 8/2006 | Burst, Jr. | 370/229 |
| 7,222,255 B1 | 5/2007 | Claessens et al. | |
| 7,274,714 B2 | 9/2007 | Raisanen et al. | |
| 7,864,816 B1* | 1/2011 | Cohen | 370/516 |
| 8,036,123 B1* | 10/2011 | Cohen | 370/235 |
| 2001/0004352 A1 | 6/2001 | Watanabe et al. | |
| 2002/0024973 A1 | 2/2002 | Tavana et al. | |
| 2002/0080791 A1 | 6/2002 | Sylvain | |
| 2002/0103937 A1 | 8/2002 | Tillmann et al. | |
| 2003/0035371 A1 | 2/2003 | Reed et al. | |
| 2003/0152028 A1* | 8/2003 | Raisanen et al. | 370/235 |
| 2003/0165160 A1 | 9/2003 | Minami et al. | |
| 2003/0172177 A1 | 9/2003 | Kersley et al. | |
| 2003/0229485 A1 | 12/2003 | Nishikawa et al. | |
| 2004/0071084 A1* | 4/2004 | El-Hennawey et al. | 370/230 |
| 2005/0058083 A1* | 3/2005 | Rogers | 370/252 |
| 2005/0094643 A1* | 5/2005 | Wang et al. | 370/395.4 |
| 2005/0099952 A1 | 5/2005 | Mohan et al. | |
| 2005/0157675 A1 | 7/2005 | Feder et al. | |
| 2005/0243822 A1* | 11/2005 | Jain et al. | 370/389 |
| 2005/0270982 A1 | 12/2005 | McBeath | |
| 2006/0007960 A1* | 1/2006 | Liu et al. | 370/503 |
| 2006/0227706 A1 | 10/2006 | Burst, Jr. | |
| 2007/0147258 A1* | 6/2007 | Mottishaw et al. | 370/241 |

OTHER PUBLICATIONS

IEEE P802.1 ag, Draft Standard for Local and Metropolitan Area Networks—Virtual Bridged Local Area Networks—Amendment 5: Connectivity Fault Management, 72 pages, May 6, 2004.

* cited by examiner

INTEGRATED CIRCUIT FOR NETWORK DELAY AND JITTER TESTING

CROSS-REFERENCE TO RELATED APPLICATIONS

This application is a continuation of U.S. application Ser. No. 11/056,753, filed on Feb. 11, 2005, which claims the benefit of U.S. Provisional Application No. 60/642,483, filed Jan. 7, 2005. The disclosures of the applications referenced above are incorporated herein by reference.

This application is related to copending U.S. application Ser. No. 11/031,984, filed Jan. 7, 2005. The disclosure of the application referenced above is incorporated herein by reference.

BACKGROUND

The present invention relates generally to network testing. More particularly, the present invention relates to integrated circuits for testing network delay and jitter.

Data networks are becoming increasingly important to all sectors of the economy. As the reliance on these data networks rises, so do the costs of network downtime or even less than optimal network performance. For these reasons, network testing, troubleshooting, and monitoring has also become increasingly important.

One approach to network testing is to purchase and deploy specialized network test equipment to test the network. One disadvantage of this approach is that such equipment is very expensive, especially when capable of testing very fast networks. Another disadvantage is that installing this specialized equipment to obtain meaningful measurements usually requires changing the network topology, possibly interfering with the normal operation of the network.

Another approach is to run network testing applications in existing network devices such as routers and the like that have built-in central processing units (CPUs). One disadvantage of this approach is that the network testing applications burden the CPUs and therefore reduce the performance of such network devices in their normal network roles. Furthermore, these CPUs are limited in performance relative to the number of ports and their speed in the network, and so cannot handle traffic at wirespeed.

SUMMARY

In general, in one aspect, the invention features an integrated circuit comprising: one or more ports to transmit and receive packets of first data; and a forwarding engine to transfer the packets of the first data between the ports; wherein at least one of the ports comprises a packet generator to originate a first packet of the first data comprising second data representing a time of transmission of the first packet of the first data, a network transmit interface to transmit the first packet of the first data, and a network receive interface to receive a second packet of the first data transmitted in reply to the first packet of the first data; and a controller to calculate a network delay based on the second data representing the time of transmission of the first packet of the first data and the second packet of the first data.

Particular implementations can include one or more of the following features. The controller calculates the network delay based on the second data representing the time of transmission of the first packet of the first data and a time of receipt of the second packet of the first data by the network receive interface. The second packet of the first data comprises third data; and wherein the controller calculates the network delay based on the second data representing the time of transmission of the first packet of the first data and the third data in the second packet of the first data. The third data in the second packet of the first data represents a time of transmission of the second packet of the first data. The third data in the second packet of the first data represents a time of receipt of the first packet of the first data. The controller calculates a plurality of the network delays; and determines a network jitter based on the plurality of the network delays. The at least one of the ports further comprises: an egress queue to store the packets of the first data received by the at least one of the ports from the forwarding engine; a test queue to store the packets of the first data originated by the packet generator; and a scheduler comprising a first input in communication with the egress queue, a second input in communication with the test queue, and an output in communication with the network transmit interface. The at least one of the ports further comprises: an ingress queue to store the packets of the first data received by the network receive interface. The integrated circuit further comprises: a classifier to determine one or more properties of the packets of the first data received by the network receive interface; a counter to count a number of packets of the first data received by the network receive interface that have properties that match one or more property definitions. The one or more property definitions comprise at least one of the group consisting of: a value for a field in the packets of the first data that indicates the packets of the first data were originated by one of the ports in the integrated circuit; a value for a field in the packets of the first data that indicates the packets of the first data were originated by a port in another integrated circuit; and one or more qualities of service for the packets of the first data. The at least one of the ports: receives a request for the contents of the counter; and transmits a packet of the first data comprising the contents of the counter. A network switch comprises the integrated circuit. A network device comprises the integrated circuit. A network device comprises the integrated circuit. The network device further comprises: a user interface to provide the one or more property definitions to the integrated circuit, and to retrieve the contents of the counter.

In general, in one aspect, the invention features a method for an integrated circuit comprising: transmitting and receive packets of first data on a plurality of ports of the integrated circuit; transferring the packets of the first data between the ports; originating a first packet of the first data comprising second data representing a time of transmission of the first packet of the first data; transmitting the first packet of the first data; receiving a second packet of the first data transmitted in reply to the first packet of the first data; and calculating a network delay based on the second data representing the time of transmission of the first packet of the first data and the second packet of the first data.

Particular implementations can include one or more of the following features. The network delay is calculated based on the second data representing the time of transmission of the first packet of the first data and a time of receipt of the second packet of the first data by the integrated circuit. The second packet of the first data comprises third data; and wherein the network delay is calculated based on the second data representing the time of transmission of the first packet of the first data and the third data in the second packet of the first data. The third data in the second packet of the first data represents a time of transmission of the second packet of the first data. The third data in the second packet of the first data represents a time of receipt of the first packet of the first data. The method further comprises: calculating a plurality of the network delays; and determining a network jitter based on the plurality of the network delays. The method further comprising: determining one or more properties of the received packets of the first data; counting a number of packets of the first data received by the network receive interface that have properties that match one or more property definitions. The one or more property definitions comprise at least one of the group consisting of: a value for a field in the packets of the first data that indicates the packets of the first data were originated by one of the ports in the integrated circuit; a value for a field in the packets of the first data that indicates the packets of the first data were originated by a port in another integrated circuit; and one or more qualities of service for the packets of the first data. The method further comprises: receiving a request for the number of packets of the first data received by the network receive interface that have properties that match the one or more property definitions; and transmitting a packet of the first data comprising the number of packets of the first data received by the network receive interface that have properties that match the one or more property definitions.

In general, in one aspect, the invention features an integrated circuit comprising: one or more ports to transmit and receive packets of first data; and a host interface to transmit and receive the packets of the first data; wherein at least one of the ports comprises a packet generator to originate a first packet of the first data comprising second data representing a time of transmission of the first packet of the first data, a network transmit interface to transmit the first packet of the first data, a network receive interface to receive a second packet of the first data transmitted in reply to the first packet of the first data; and a controller to calculate a network delay based on the second data representing the time of transmission of the first packet of the first data and the second packet of the first data.

Particular implementations can include one or more of the following features. The controller calculates the network delay based on the second data representing the time of transmission of the first packet of the first data and a time of receipt of the second packet of the first data by the network receive interface. The second packet of the first data comprises third data; and wherein the controller calculates the network delay based on the second data representing the time of transmission of the first packet of the first data and the third data in the second packet of the first data. The third data in the second packet of the first data represents a time of transmission of the second packet of the first data. The third data in the second packet of the first data represents a time of receipt of the first packet of the first data. The controller calculates a plurality of the network delays; and determines a network jitter based on the plurality of the network delays. The at least one of the ports further comprises: an egress queue to store the packets of the first data received by the at least one of the ports from the host interface; a test queue to store the packets of the first data originated by the packet generator; and a scheduler comprising a first input in communication with the egress queue, a second input in communication with the test queue, and an output in communication with the network transmit interface. The at least one of the ports further comprises: an ingress queue to store the packets of the first data received by the network receive interface. The at least one of the ports further comprises a network receive interface to receive packets of the first data; and wherein the integrated circuit farther comprises a classifier to determine one or more properties of the packets of the first data received by the network receive interface, and a counter to count a number of packets of the first data received by the network receive interface that have properties that match one or more property definitions. The one or more property definitions comprise at least one of the group consisting of: a value for a field in the packets of the first data that indicates the packets of the first data were originated by one of the ports in the integrated circuit; a value for a field in the packets of the first data that indicates the packets of the first data were originated by a port in another integrated circuit; and one or more qualities of service for the packets of the first data. The at least one of the ports: receives a request for the contents of the counter; and transmits a packet of the first data comprising the contents of the counter. A network switch comprising the integrated circuit. A network device comprising the integrated circuit. A network device comprising the integrated circuit. The network device further comprises: a user interface to provide the one or more property definitions to the integrated circuit, and to retrieve the contents of the counter.

In general, in one aspect, the invention features a method for an integrated circuit comprising: transmitting and receiving packets of first data on one or more ports of the integrated circuit; originating a first packet of the first data comprising second data representing a time of transmission of the first packet of the first data, transmitting the first packet of the first data, receiving a second packet of the first data transmitted in reply to the first packet of the first data; and calculating a network delay based on the second data representing the time of transmission of the first packet of the first data and the second packet of the first data.

Particular implementations can include one or more of the following features. The network delay is calculated based on the second data representing the time of transmission of the first packet of the first data and a time of receipt of the second packet of the first data by the network receive interface. The second packet of the first data comprises third data; and wherein the network delay is calculated based on the second data representing the time of transmission of the first packet of the first data and the third data in the second packet of the first data. The third data in the second packet of the first data represents a time of transmission of the second packet of the first data. The third data in the second packet of the first data represents a time of receipt of the first packet of the first data. The method further comprises: calculating a plurality of the network delays; and determining a network jitter based on the plurality of the network delays. The method further comprises: determining one or more properties of the received packets of the first data, and counting a number of packets of the first data received by the network receive interface that have properties that match one or more property definitions. The one or more property definitions comprise at least one of the group consisting of: a value for a field in the packets of the first data that indicates the packets of the first data were originated by one of the ports in the integrated circuit; a value for a field in the packets of the first data that indicates the packets of the first data were originated by a port in another integrated circuit; and one or more qualities of service for the packets of the first data. The method further comprises: receiving a request for the number of packets of the first data received by the network receive interface that have properties that match the one or more property definitions; and transmitting a packet of the first data comprising the number of packets of the first data received by the network receive interface that have properties that match the one or more property definitions.

In general, in one aspect, the invention features an integrated circuit comprising: one or more port means for transmitting and receiving packets of first data; and forwarding means for transferring the packets of the first data between the ports; wherein at least one of the port means comprises packet generator means for originating a first packet of the first data comprising second data representing a time of transmission of the first packet of the first data, network transmit means for transmitting the first packet of the first data, and network receive means for receiving a second packet of the first data transmitted in reply to the first packet of the first data; and controller means for calculating a network delay based on the second data representing the time of transmission of the first packet of the first data and the second packet of the first data.

Particular implementations can include one or more of the following features. The controller means calculates the network delay based on the second data representing the time of transmission of the first packet of the first data and a time of receipt of the second packet of the first data by the network receive means. The second packet of the first data comprises third data; and wherein the controller means calculates the network delay based on the second data representing the time of transmission of the first packet of the first data and the third data in the second packet of the first data. The third data in the second packet of the first data represents a time of transmission of the second packet of the first data. The third data in the second packet of the first data represents a time of receipt of the first packet of the first data the controller means calculates a plurality of the network delays; and determines a network jitter based on the plurality of the network delays. The at least one of the port means further comprises: egress queue means for storing the packets of the first data received by the at least one of the ports from the forwarding means; test queue means for storing the packets of the first data originated by the packet generator means; and scheduler means comprising first input means for communicating with the egress queue means, second input means for communicating with the test queue means, and output means for communicating with the network transmit means. The at least one of the port means further comprises: ingress queue means for storing the packets of the first data received by the network receive means. The integrated circuit further comprises: classifier means for determining one or more properties of the packets of the first data received by the network receive means; counter means for counting a number of packets of the first data received by the network receive means that have properties that match one or more property definitions. The one or more property definitions comprise at least one of the group consisting of: a value for a field in the packets of the first data that indicates the packets of the first data were originated by one of the port means in the integrated circuit; a value for a field in the packets of the first data that indicates the packets of the first data were originated by a port in another integrated circuit; and one or more qualities of service for the packets of the first data. The at least one of the ports: receives a request for the contents of the counter means; and transmits a packet of the first data comprising the contents of the counter means. A network switch comprises the integrated circuit. A network device comprises the integrated circuit. A network device comprises the integrated circuit. The network device further comprises: user interface means for providing the one or more property definitions to the integrated circuit, and for retrieving the contents of the counter means.

In general, in one aspect, the invention features a computer program for an integrated circuit transmitting and receive packets of first data on a plurality of ports of the integrated circuit, the computer program comprising: originating a first packet of the first data comprising second data representing a time of transmission of the first packet of the first data; causing the integrated circuit to transmit the first packet of the first data; wherein the integrated circuit receives a second packet of the first data transmitted in reply to the first packet of the first data; and calculating a network delay based on the second data representing the time of transmission of the first packet of the first data and the second packet of the first data.

Particular implementations can include one or more of the following features. The network delay is calculated based on the second data representing the time of transmission of the first packet of the first data and a time of receipt of the second packet of the first data by the integrated circuit. The second packet of the first data comprises third data; and wherein the network delay is calculated based on the second data representing the time of transmission of the first packet of the first data and the third data in the second packet of the first data. The third data in the second packet of the first data represents a time of transmission of the second packet of the first data. The third data in the second packet of the first data represents a time of receipt of the first packet of the first data. The computer program further comprises: calculating a plurality of the network delays; and determining a network jitter based on the plurality of the network delays. The computer program further comprises: determining one or more properties of the received packets of the first data; counting a number of packets of the first data received by the integrated circuit that have properties that match one or more property definitions. The one or more property definitions comprise at least one of the group consisting of: a value for a field in the packets of the first data that indicates the packets of the first data were originated by one of the ports in the integrated circuit; a value for a field in the packets of the first data that indicates the packets of the first data were originated by a port in another integrated circuit; and one or more qualities of service for the packets of the first data. The computer program further comprises: receiving a request for the number of packets of the first data received by the network receive interface that have properties that match the one or more property definitions; and causing the integrated circuit to transmit a packet of the first data comprising the number of packets of the first data received by the network receive interface that have properties that match the one or more property definitions.

In general, in one aspect, the invention features an integrated circuit comprising: one or more port means for transmitting and receiving packets of first data; and host interface means for transmitting and receiving the packets of the first data; wherein at least one of the port means comprises packet generator means for originating a first packet of the first data comprising second data representing a time of transmission of the first packet of the first data, network transmit means for transmitting the first packet of the first data, network receive means for receiving a second packet of the first data transmitted in reply to the first packet of the first data; and controller means for calculating a network delay based on the second data representing the time of transmission of the first packet of the first data and the second packet of the first data.

Particular implementations can include one or more of the following features. The controller means calculates the network delay based on the second data representing the time of transmission of the first packet of the first data and a time of receipt of the second packet of the first data by the network receive means. The second packet of the first data comprises third data; and wherein the controller means calculates the network delay based on the second data representing the time of transmission of the first packet of the first data and the third data in the second packet of the first data. The third data in the second packet of the first data represents a time of transmission of the second packet of the first data. The third data in the second packet of the first data represents a time of receipt of the first packet of the first data. The controller means calculates a plurality of the network delays; and determines a network jitter based on the plurality of the network delays. The at least one of the port means further comprises: egress queue means for storing the packets of the first data received by the at least one of the ports from the host interface means; test queue means for storing the packets of the first data originated by the packet generator means; and means for scheduling comprising first input means for communicating with the egress queue means, second input means for communicating with the test queue means, and output means for communicating with the network transmit means. The at least one of the port means further comprises: ingress queue means for storing the packets of the first data received by the network receive means. The at least one of the port means further comprises network receive means for receiving packets of the first data; and wherein the integrated circuit further comprises classifier means for determining one or more properties of the packets of the first data received by the network receive means, and counter means for counting a number of packets of the first data received by the network receive means that have properties that match one or more property definitions. The one or more property definitions comprise at least one of the group consisting of: a value for a field in the packets of the first data that indicates the packets of the first data were originated by one of the port means in the integrated circuit; a value for a field in the packets of the first data that indicates the packets of the first data were originated by a port in another integrated circuit; and one or more qualities of service for the packets of the first data. The at least one of the port means: receives a request for the contents of the counter means; and transmits a packet of the first data comprising the contents of the counter means. A network switch comprises the integrated circuit. A network device comprising the integrated circuit. A network device comprising the integrated circuit. The network device further comprises: user interface means for providing the one or more property definitions to the integrated circuit, and to retrieve the contents of the counter means.

In general, in one aspect, the invention features a computer program for an integrated circuit transmitting and receiving packets of first data on one or more ports of the integrated circuit, the computer program comprising: originating a first packet of the first data comprising second data representing a time of transmission of the first packet of the first data, causing the integrated circuit to transmit the first packet of the first data, wherein the integrated circuit receives a second packet of the first data transmitted in reply to the first packet of the first data; and calculating a network delay based on the second data representing the time of transmission of the first packet of the first data and the second packet of the first data.

Particular implementations can include one or more of the following features. The network delay is calculated based on the second data representing the time of transmission of the first packet of the first data and a time of receipt of the second packet of the first data by the integrated circuit. The second packet of the first data comprises third data; and wherein the network delay is calculated based on the second data representing the time of transmission of the first packet of the first data and the third data in the second packet of the first data. The third data in the second packet of the first data represents a time of transmission of the second packet of the first data. The third data in the second packet of the first data represents a time of receipt of the first packet of the first data. The computer program further comprises: calculating a plurality of the network delays; and determining a network jitter based on the plurality of the network delays. The computer program further comprises: determining one or more properties of the received packets of the first data, and counting a number of packets of the first data received by the integrated circuit that have properties that match one or more property definitions. The one or more property definitions comprise at least one of the group consisting of: a value for a field in the packets of the first data that indicates the packets of the first data were originated by one of the ports in the integrated circuit; a value for a field in the packets of the first data that indicates the packets of the first data were originated by a port in another integrated circuit; and one or more qualities of service for the packets of the first data. The computer program further comprises: receiving a request for the number of packets of the first data received by the network receive interface that have properties that match the one or more property definitions; and causing the integrated circuit to transmit a packet of the first data comprising the number of packets of the first data received by the network receive interface that have properties that match the one or more property definitions.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

Embodiments of the present invention provide integrated circuits that conduct network delay and jitter testing at the media access control (MAC) level and above. Because the testing occurs at the ASIC level, the CPUs in network devices employing integrated circuits according to the present invention are only minimally burdened by the testing.

The networks tested can include any sort of network such as wired, wireless, optical, and so on, and can range in scope from a single network device to very large networks comprising many network devices. While embodiments of the present invention are described with respect to a network switch embodiment and a network interface controller embodiment, it will be understood by those skilled in the relevant arts after reading this description that embodiments of the present invention can be implemented in other sorts of network devices as well, such as wireless access points, wireless clients, and the like.

Figure 1:
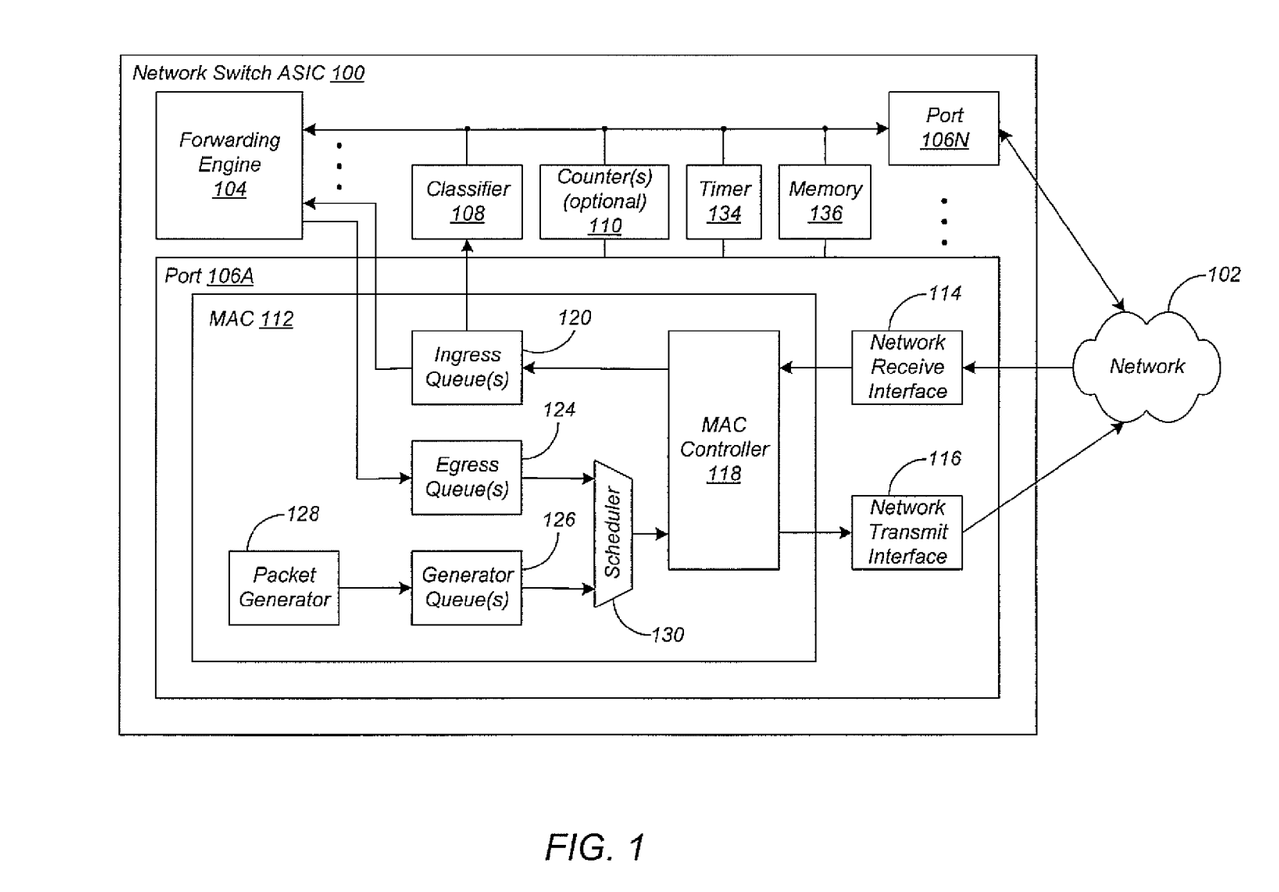
FIG. 1 shows a network switch application-specific integrated circuit (ASIC) in communication with a network according to a preferred embodiment of the present invention.

FIG. 1 shows a network switch application-specific integrated circuit (ASIC) 100 in communication with a network 102 according to a preferred embodiment of the present invention. ASIC 100 comprises a forwarding engine 104 to transfer packets of data between a plurality of ports 106A through 106N, a classifier 108 to determine properties of packets received by ASIC 100, a timer 134 to provide a time basis for the delay and jitter measurements, one or more optional counters 110 to count packets, and a memory 136 for storing contents of the counters and parameters calculated based on those contents. In some embodiments, some or all of timer 134 and counters 110 are implemented within ports 106. Preferably ASIC 100 comprises various counters. Those on the port level simply count how many packets are received and sent. More sophisticated counters also on the port level can count certain type of packets based on low-level indications such as bad CRC, runt packets, packets too long, and the like. Each block comprises additional counters that can count the criteria supported by that block. For example, forwarding engine 104 comprises counters that can count how many packets have been received or sent on a specific route. As another example, classifier 108 comprises counters that count only packets belonging to a specific flow.

FIG. 1 also shows detail of one of the ports 106A, which comprises a media access controller (MAC) 112, a network receive interface 114 to receive packets of data from network 102, and a network transmit interface 116 to transmit packets of data to network 102. MAC 112 comprises a MAC controller 118, one or more ingress queues 120 to store packets received by port 106A from network 102, and one or more egress queues 122 to store packets to be transmitted by port 106A to network 102. In some embodiments, some or all of the functions of MAC controller 118 are implemented in a central controller in ASIC 100.

Port 106A also comprises a packet generator 128 to generate one or more packets comprising a time stamp according to timer 134, one or more generator queues 126 to store packets generated by packet generator 128, and a scheduler 130 to schedule packets in egress queues 124 and generator queues 126 for transmission to network 102. This arrangement permits ASIC 100 to conduct network testing while also handling regular network traffic.

Figure 2:
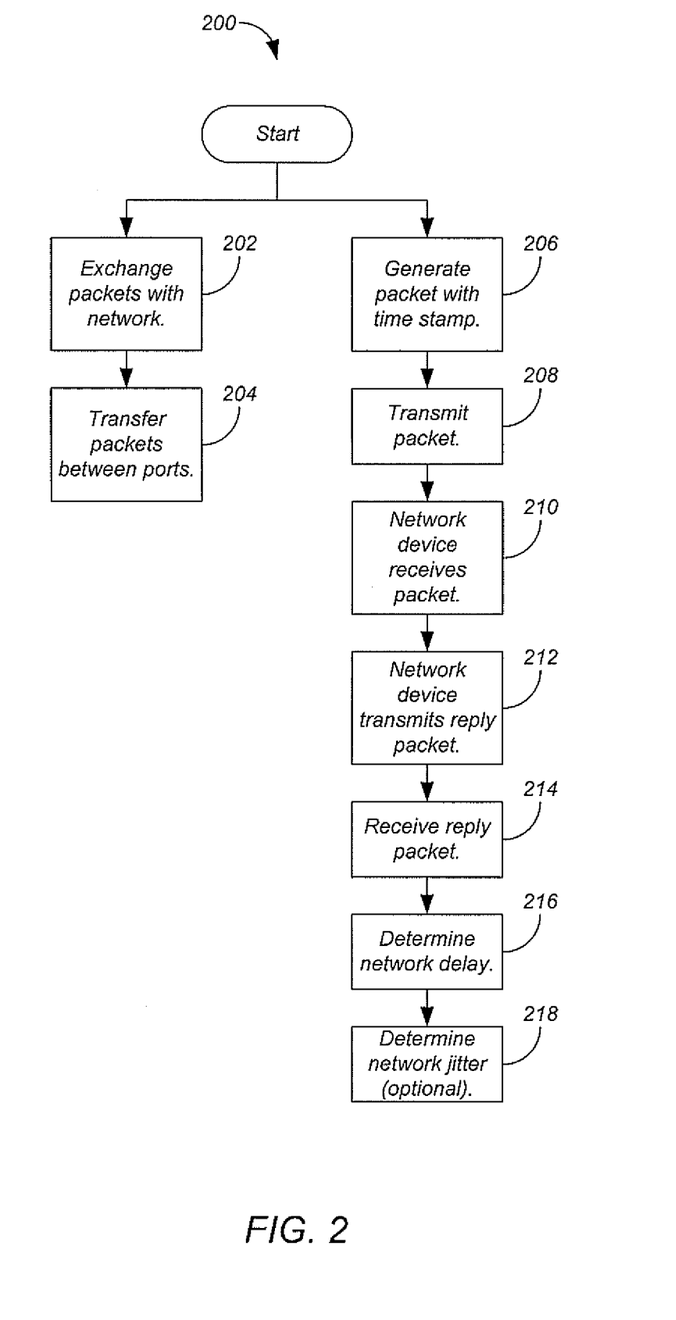
FIG. 2 shows a process for the ASIC of FIG. 1 according to a preferred embodiment.

FIG. 2 shows a process 200 for ASIC 100 of FIG. 1 according to a preferred embodiment. ASIC 100 operates as a network switch. Therefore ports 106 transmit and receive packets of data to and from network 102 (step 202) and forwarding engine 104 transfers the packets between ports 106 (step 204) according to methods well-known in the relevant arts.

Port 106A measures network delay and jitter according to a preferred embodiment. MAC controller 118 generates a packet comprising a time stamp representing a time of transmission of the packet (step 206). Network transmit interface 116 transmits the packet originated by the packet generator (step 208). As used herein, the terms "originate" and "originated" are used to indicate that the packets so described are packets that are generated by a packet generator 128 in a MAC 106, in contrast to packets that merely pass through a MAC 106, such as packets received from network 102 or forwarding engine 104.

The packet originated and transmitted by port 106A is received by a network device (step 210), which transmits a reply to the packet (step 212). Port 106A receives the reply packet (step 214) and store the reply packet in ingress queues 120.

Controller 118 calculates a network delay based on the reply packet and the time stamp in the packet originated and transmitted by port 106A (step 216). In one embodiment, controller 118 calculates a two-way network delay based on the time of receipt of the reply packet. In another embodiment, controller 118 calculates a one-way network delay based on a time stamp in the reply packet that represents a time of transmission of the reply packet or a time of receipt of the packet originated and transmitted by port 106A.

In some embodiments, ASIC 100 makes a plurality of network delay calculations, and determines a network jitter based on those calculations (step 218). For example, the network jitter can be determined as the standard deviation of the network delays. Of course, other calculations for determining network jitter can be employed.

These network delay and network jitter tests can be implemented without burdening any CPU controlling ASIC 100. For example, in response to a command provided by such a CPU, ASIC 100 can execute process 200 of FIG. 2 and provide network delay and network jitter results to the CPU. The only burden to the CPU is the time required to send the command and receive the results.

Figure 3:
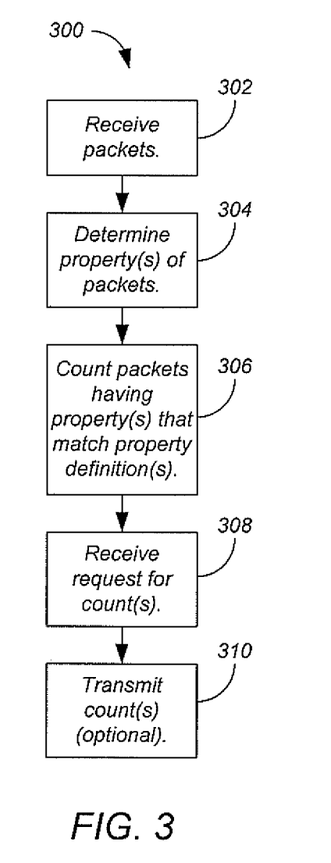
FIG. 3 shows a process for packet counting according to a preferred embodiment.

In some embodiments ASIC 100 also counts certain packets received from network 102, for example to support a packet loss calculation by another ASIC. FIG. 3 shows a process 300 for such packet counting according to a preferred embodiment. A port 106 in ASIC 100 receives a plurality of packets (step 302) and stores them in ingress queues 120. Classifier 108 determines one or more properties of the packets (step 304). Preferably classifier 108 is implemented using a Ternary Content Addressable Memory (TCAM) with a dual lookup within the TCAM for each packet. One lookup is a search dedicated to detecting the packet parameters for the present invention. The other lookup classifies regular network traffic, for example to address access control list (ACL) and quality of service (QoS) applications.

One or more of counters 110 counts the number of received packets having properties that match one or more property definitions (step 306). The property definitions can include, for example, a value for a field in the packets that indicates the packets were originated by one of the ports 106 in ASIC 100, a value for a field in packets that indicates the packets were originated by a port in another ASIC, one or more qualities of service for the packets, and the like.

ASIC 100 optionally transmits the packet count in response to a request. ASIC 100 receives a request for the contents of one or more of counters 110 (step 308). In response, ASIC 100 transmits a packet of data comprising the contents of counter(s) 110 (step 310).

ASIC 100 can be implemented in a network device such as a network switch. The network switch can include a user interface to provide the one or more packet definitions and property definitions to ASIC 100, and to retrieve data from ASIC 100, such as the contents of counter(s) 110.

Figure 4:
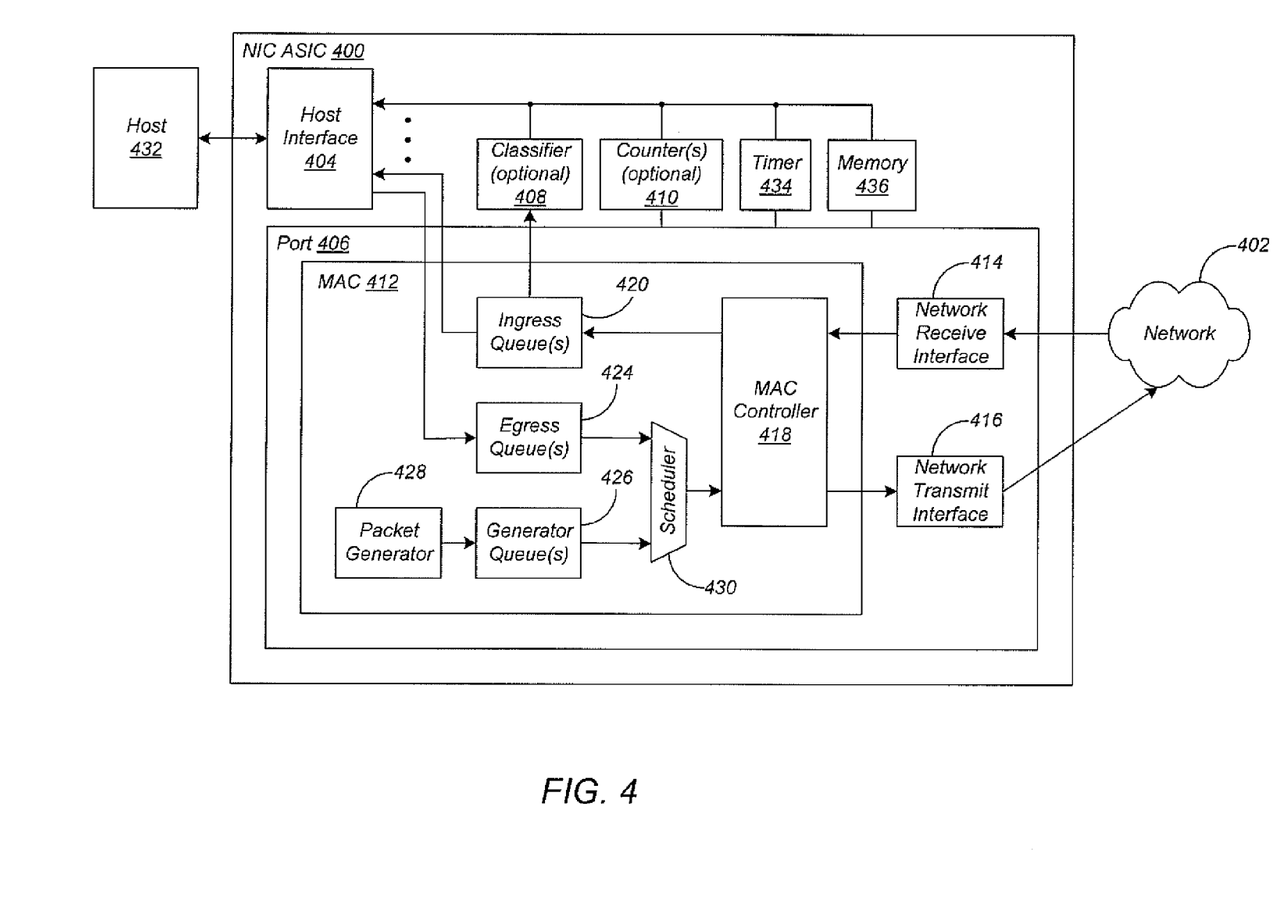
FIG. 4 shows a network interface controller ASIC in communication with a host and a network according to a preferred embodiment of the present invention.

FIG. 4 shows a network interface controller ASIC 400 in communication with a host 432 and a network 402 according to a preferred embodiment of the present invention. ASIC 400 comprises a host interface 404 to exchange packets of data with host 432, a port 406 to exchange packets of data with network 402, a classifier 408 to determine properties of packets received by ASIC 400, a timer 434 to provide a time basis for the delay and jitter measurements, one or more optional counters 410 to count packets, and a memory 436 for storing contents of the counters and parameters calculated based on those contents. In some embodiments, some or all of timer 434 and counters 410 are implemented within port 406.

FIG. 4 also shows detail of port 406, which comprises a media access controller (MAC) 412, a network receive interface 414 to receive packets of data from network 402, and a network transmit interface 416 to transmit packets of data to network 402. MAC 412 comprises a MAC controller 418, one or more ingress queues 420 to store packets received by port 406 from network 402, and one or more egress queues 422 to store packets to be transmitted by port 406 to network 402. In some embodiments, some or all of the functions of MAC controller 418 are implemented in a central controller in ASIC 400.

Port 406 also comprises a packet generator 428 to generate one or more packets comprising a time stamp according to timer 434, one or more generator queues 426 to store packets generated by packet generator 428, and a scheduler 430 to schedule packets in egress queues 424 and generator queues 426 for transmission to network 402. This arrangement permits ASIC 400 to conduct network testing while also handling regular network traffic.

Figure 5:
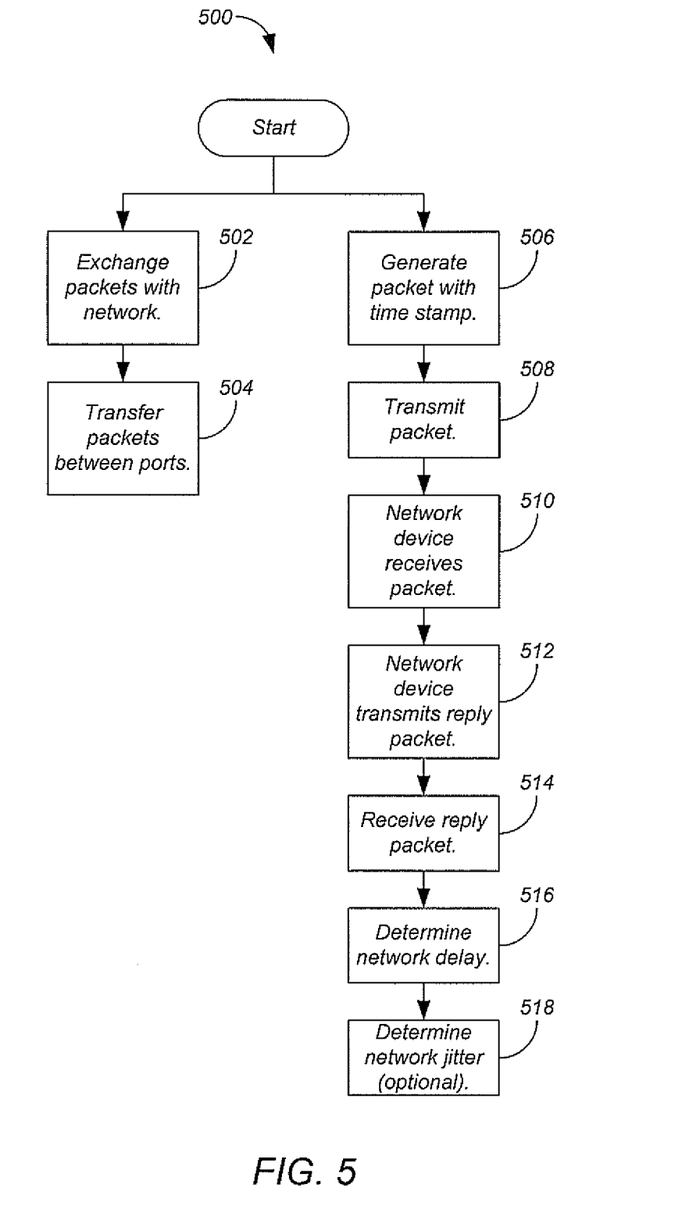
FIG. 5 shows a process for the ASIC of FIG. 6 according to a preferred embodiment.

FIG. 5 shows a process 500 for ASIC 400 of FIG. 4 according to a preferred embodiment. ASIC 400 operates as a network interface controller. Therefore port 406 transmits and receives packets of data to and from network 402 (step 502) and host interface 404 transfers the packets between port 406 and host 432 (step 504) according to methods well-known in the relevant arts.

Port 406 measures network delay and jitter according to a preferred embodiment. MAC controller 418 generates a packet comprising a time stamp representing a time of transmission of the packet (step 506). Network transmit interface 416 transmits the packet originated by the packet generator (step 508). As used herein, the terms "originate" and "originated" are used to indicate that the packets so described are packets that are generated by a packet generator 428 in a MAC 406, in contrast to packets that merely pass through a MAC 406, such as packets received from network 402 or forwarding engine 404.

The packet originated and transmitted by port 406 is received by a network device (step 510), which transmits a reply to the packet (step 512). Port 406 receives the reply packet (step 514) and store the reply packet in ingress queues 420.

Controller 418 calculates a network delay based on the reply packet and the time stamp in the packet originated and transmitted by port 406 (step 516). In one embodiment, controller 418 calculates a two-way network delay based on the time of receipt of the reply packet. In another embodiment, controller 418 calculates a one-way network delay based on a time stamp in the reply packet that represents a time of transmission of the reply packet or a time of receipt of the packet originated and transmitted by port 406.

In some embodiments, ASIC 400 makes a plurality of network delay calculations, and determines a network jitter based on those calculations (step 518). For example, the network jitter can be determined as the standard deviation of the network delays. Of course, other calculations for determining network jitter can be employed.

Figure 6:
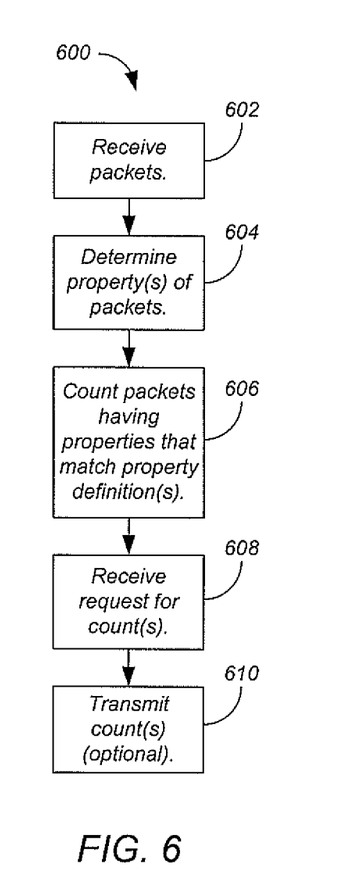
FIG. 6 shows a process for packet counting according to a preferred embodiment.

These network delay and network jitter tests can be implemented without burdening any CPU controlling ASIC 400. For example, in response to a command provided by such a CPU, ASIC 400 can execute process 500 of FIG. 5 and provide network delay and network jitter results to the CPU. The only burden to the CPU is the time required to send the command and receive the results. In some embodiments ASIC 400 also counts certain packets received from network 402, for example to support a packet loss calculation by another ASIC. FIG. 6 shows a process 600 for such packet counting according to a preferred embodiment. Port 406 in ASIC 400 receives a plurality of packets (step 602) and stores them in ingress queues 420. Classifier 408 determines one or more properties of the packets (step 604). Preferably classifier 408 is implemented according to a dual lookup for each packet, as described above.

One or more of counters 410 counts the number of received packets having properties that match one or more property definitions (step 606). The property definitions can include, for example, a value for a field in the packets that indicates the packets were originated by one of the ports 406 in ASIC 400, a value for a field in packets that indicates the packets were originated by a port in another ASIC, one or more qualities of service for the packets, and the like.

ASIC 400 optionally transmits the packet count in response to a request. ASIC 400 receives a request for the contents of one or more of counters 410 (step 608). In response, ASIC 400 transmits a packet of data comprising the contents of counter(s) 410 (step 610).

ASIC 400 can be implemented in a network device such as a network interface card. The network interface card can include a user interface to provide the one or more packet definitions and property definitions to ASIC 400, and to retrieve data from ASIC 400, such as the contents of counter(s) 410.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An integrated circuit comprising:
   one or more ports to transmit and receive packets of first data on a network; and
   a forwarding engine to transfer the packets of the first data between the ports,
   wherein at least one of the ports comprises
   a packet generator to originate a first packet of the first data received by the at least one of the ports from the network, wherein the first packet comprises second data representing a time of generation of the first packet of the first data;

a network transmit interface to transmit the first packet of the first data;

a network receive interface to receive a second packet transmitted in reply to the first packet of the first data;

a controller configured to calculate a network delay including a queue delay occurring when the first packet is queued for transmission based on the second data representing the time of generation of the first packet of the first data and a time of receipt or transmission of the second packet or a time of receipt of the first packet included in the second packet;

an egress queue to store the packets of the first data received by the at least one of the ports from the forwarding engine;

a test queue to store the packets of the first data originated by the packet generator; and a scheduler comprising (i) a first input in communication with the egress queue, (ii) a second input in communication with the test queue, and (iii) an output in communication with the controller, wherein the scheduler is configured to schedule packets in the egress queue and the test queue for transmission to the network, and wherein the controller is configured to perform network testing while also handling regular network traffic.

2. The integrated circuit of claim 1, wherein the controller:

includes third data in the first packet, wherein the third data represents a time when the first packet is transmitted; and calculates the network delay based on (i) the third data representing the time when the first packet is transmitted and (ii) the time of receipt of the second packet by the network receive interface.

3. The integrated circuit of claim 1, wherein the controller:

calculates a plurality of the network delays; and determines network jitter based on the plurality of the network delays.

4. The integrated circuit of claim 1, wherein the at least one of the ports further comprises an ingress queue to store the packets of the first data received by the network receive interface.

5. The integrated circuit of claim 1, further comprising:

a classifier to determine one or more properties of the packets of the first data received by the network receive interface; and a counter to count a number of packets of the first data received by the network receive interface having properties matching one or more property definitions.

6. A network switch comprising the integrated circuit of claim 1.

7. A network device comprising the integrated circuit of claim 1, wherein the network device includes one of a wireless access point, a wireless client station, a router, and a gateway.

8. A method comprising:

transmitting and receiving packets of first data on a network via a plurality of ports of an integrated circuit;

transferring the packets of the first data between the ports;

generating using a packet generator included in one of the ports a first packet of the first data received by the one of the ports from the network, wherein the first packet comprises second data representing a time of generation of the first packet of the first data;

transmitting the first packet of the first data;

receiving a second packet transmitted in reply to the first packet of the first data;

calculating a network delay including a queue delay occurring when the first packet is queued for transmission based on the second data representing the time of generation of the first packet of the first data and a time of receipt or transmission of the second packet or a time of receipt of the first packet included in the second packet;

storing in an egress queue the packets of the first data received by the one of the ports;

storing in a test queue the packets of the first data originated by the packet generator;

scheduling packets in the egress queue and the test queue for transmission to the network; and performing network testing while also handling regular network traffic.

9. The method of claim 8 further comprising:

including third data in the first packet, wherein the third data represents a time when the first packet is transmitted; and calculating the network delay based on (i) the third data representing the time when the first packet is transmitted and (ii) the time of receipt of the second packet.

10. The method of claim 8, further comprising:

calculating a plurality of the network delays; and determining network jitter based on the plurality of the network delays.

11. The method of claim 8, further comprising:

determining one or more properties of the received packets of the first data; and counting a number of packets of the first data received having properties matching one or more property definitions.

* * * * *